(12) United States Patent
Anderson et al.

(10) Patent No.: US 12,001,529 B1
(45) Date of Patent: Jun. 4, 2024

(54) COUNTING MACHINE FOR MANUFACTURING AND VALIDATING EVENT-RELEVANT IDENTITIES VIA AN ENSEMBLE NETWORK

(71) Applicant: Validate Me LLC, Stamford, CT (US)

(72) Inventors: James Anderson, Morris Plains, NJ (US); Thomas J. Saleh, Stamford, CT (US); Lawrence C. Rafsky, Juniper, FL (US)

(73) Assignee: Validate Me LLC, Ridgefield, CT (US)

( * ) Notice: Subject to any disclaimer, the term of this patent is extended or adjusted under 35 U.S.C. 154(b) by 0 days.

(21) Appl. No.: 17/519,634

(22) Filed: Nov. 5, 2021

(51) Int. Cl.
  *G06F 21/31* (2013.01)
(52) U.S. Cl.
  CPC .................................. *G06F 21/31* (2013.01)
(58) Field of Classification Search
  CPC .............................. G06F 21/31; H04L 67/1057
  See application file for complete search history.

(56) References Cited

U.S. PATENT DOCUMENTS

| | | | | |
|---|---|---|---|---|
| 5,285,199 A * | 2/1994 | Pocek | ....................... | H04L 9/40 370/252 |
| 5,799,323 A * | 8/1998 | Mosher, Jr. | ......... | G06F 11/2074 714/E11.107 |
| 6,311,058 B1 * | 10/2001 | Wecker | ............... | H04L 63/0236 455/418 |
| 6,442,608 B1 * | 8/2002 | Knight | .................... | H04L 63/10 709/225 |
| 7,228,281 B1 * | 6/2007 | Ney | ...................... | G06Q 10/103 705/301 |
| 7,428,514 B2 * | 9/2008 | Jin | ......................... | G06N 3/126 706/45 |
| 7,783,583 B2 * | 8/2010 | Sendhoff | ................ | G06Q 10/04 706/13 |
| 8,413,234 B1 * | 4/2013 | Zang | ..................... | H04M 15/47 726/22 |
| 8,590,014 B1 * | 11/2013 | Haugsnes | ........... | H04L 63/1433 726/3 |
| 8,819,127 B1 * | 8/2014 | Pickelhaupt | ........ | H04L 63/0823 709/250 |
| 9,122,694 B1 * | 9/2015 | Dukes | .................... | G06F 3/0608 |
| 9,152,333 B1 * | 10/2015 | Johnston | ................. | G06F 3/067 |
| 9,477,471 B1 * | 10/2016 | Iyer | ........................ | G06F 9/544 |

(Continued)

*Primary Examiner* — Aravind K Moorthy
(74) *Attorney, Agent, or Firm* — Gugliotta & Gugliotta, LPA (57) ABSTRACT

A Counting Machine for Manufacturing and Validating Event-Relevant IDs, tagged with both Trust and Confidence Scores, for Specific Entities (Individuals and Enterprises) and their Prosoponyms using a Managed Secure-Immutable-Nonreputable-Replicated-Verifiable and Fault-Tolerant Distributed Datastore via an Ensemble-Based Network of both Existing and Newly-Created Heterogenous Single- and Multi-Factor ID Validation Services, the Ensemble consisting of both Commercial Organizations (known as Members) requiring valid Entity IDs for use during various events, such as purchase transactions, and Service Providers (known as Partners) who supply technology services for ID validation (as standalone services or as licensed by Members). The instant abstract is neither intended to define the invention disclosed in this specification nor intended to limit the scope of the invention in any way.

19 Claims, 9 Drawing Sheets

(56) References Cited

U.S. PATENT DOCUMENTS

| | | | |
|---|---|---|---|
| 9,521,576 B2* | 12/2016 | Chou | H04W 28/0236 |
| 9,646,172 B1* | 5/2017 | Hahn | G06F 21/602 |
| 9,773,010 B1* | 9/2017 | Ganesh | G06F 11/3476 |
| 9,977,807 B1* | 5/2018 | Bowman | G06F 16/381 |
| 10,104,237 B1* | 10/2018 | Amin | H04L 65/102 |
| 10,331,350 B1* | 6/2019 | Kucherov | G06F 12/02 |
| 10,521,623 B2* | 12/2019 | Rodriguez | H04L 63/0838 |
| 10,642,766 B1* | 5/2020 | Kilsdonk | G06F 9/3001 |
| 10,650,046 B2* | 5/2020 | Bequet | G06F 16/9014 |
| 10,693,872 B1* | 6/2020 | Larson | H04L 9/3231 |
| 11,080,423 B1* | 8/2021 | Kassam-Adams | G16H 15/00 |
| 11,232,106 B1* | 1/2022 | Gattu | H04L 43/067 |
| 2001/0028603 A1* | 10/2001 | Shimazu | G06F 16/2457 368/10 |
| 2005/0060312 A1* | 3/2005 | Curtiss | G06F 16/951 |
| 2005/0125668 A1* | 6/2005 | Botz | G06Q 20/3829 713/171 |
| 2008/0010497 A1* | 1/2008 | Kronlund | G06F 11/0769 714/6.11 |
| 2008/0120205 A1* | 5/2008 | Hoopes | G06Q 10/087 705/28 |
| 2008/0133672 A1* | 6/2008 | Gillum | G06Q 10/107 709/206 |
| 2008/0154852 A1* | 6/2008 | Beyer | G06F 12/0864 711/170 |
| 2008/0163122 A1* | 7/2008 | Wolf | G06F 16/168 715/847 |
| 2008/0187329 A1* | 8/2008 | Van Buren | G03G 21/02 399/24 |
| 2008/0228680 A1* | 9/2008 | Chen | G06N 3/045 706/21 |
| 2008/0312910 A1* | 12/2008 | Zhang | G06F 16/3338 704/10 |
| 2009/0083473 A1* | 3/2009 | Taniguchi | G06F 21/608 711/E12.082 |
| 2009/0113530 A1* | 4/2009 | Brainard | G06F 21/31 726/5 |
| 2009/0260069 A1* | 10/2009 | Nakajima | H04L 9/321 726/7 |
| 2010/0169274 A1* | 7/2010 | Kulkarni | G06F 16/22 711/216 |
| 2013/0246279 A1* | 9/2013 | Everett | G06Q 20/02 705/64 |
| 2014/0013065 A1* | 1/2014 | Arakawa | G06F 21/6254 711/154 |
| 2014/0019617 A1* | 1/2014 | Hadar | H04L 63/20 709/225 |
| 2014/0026231 A1* | 1/2014 | Barak | H04L 63/20 726/29 |
| 2014/0075494 A1* | 3/2014 | Fadida | G06F 9/45558 726/1 |
| 2014/0115258 A1* | 4/2014 | Week | G06F 16/1752 711/163 |
| 2014/0181988 A1* | 6/2014 | Umeda | G06F 21/6254 726/26 |
| 2014/0188797 A1* | 7/2014 | Araki | G06F 16/27 707/624 |
| 2014/0282586 A1* | 9/2014 | Shear | G06F 9/5072 718/104 |
| 2014/0304464 A1* | 10/2014 | Bert | G06F 3/0688 711/105 |
| 2015/0033305 A1* | 1/2015 | Shear | G06F 21/53 726/11 |
| 2015/0074007 A1* | 3/2015 | Gabriel | G06F 16/9024 705/311 |
| 2015/0134589 A1* | 5/2015 | Marrelli | G06F 16/254 707/602 |
| 2015/0134602 A1* | 5/2015 | Nicholas | G06F 16/23 707/609 |
| 2015/0220600 A1* | 8/2015 | Bellamkonda | G06F 16/245 707/747 |
| 2015/0296519 A1* | 10/2015 | Herger | H04L 41/0816 370/230 |
| 2015/0333913 A1* | 11/2015 | Dayka | H04L 9/3247 713/176 |
| 2016/0028724 A1* | 1/2016 | Gillett | G06Q 20/16 726/7 |
| 2016/0034305 A1* | 2/2016 | Shear | G06F 16/285 707/722 |
| 2016/0134599 A1* | 5/2016 | Ross | H04L 63/0815 713/168 |
| 2016/0299255 A1* | 10/2016 | Dail | G01W 1/10 |
| 2016/0323792 A1* | 11/2016 | Theogaraj | H04L 43/08 |
| 2016/0378781 A1* | 12/2016 | Jerrard-Dunne | G06F 16/1734 707/692 |
| 2017/0083535 A1* | 3/2017 | Marchukov | H04L 67/125 |
| 2017/0090760 A1* | 3/2017 | Kalipatnapu | G06F 3/0604 |
| 2017/0161020 A1* | 6/2017 | Meredith | G06F 7/36 |
| 2017/0208483 A1* | 7/2017 | Chmiel | H04W 72/21 |
| 2018/0041571 A1* | 2/2018 | Rogers | G06F 16/48 |
| 2018/0165335 A1* | 6/2018 | Kong | G06F 16/244 |
| 2018/0176017 A1* | 6/2018 | Rodriguez | H04L 63/20 |
| 2018/0295150 A1* | 10/2018 | Oikarinen | H04L 63/1441 |
| 2019/0079876 A1* | 3/2019 | Kim | G06F 12/0864 |
| 2019/0334884 A1* | 10/2019 | Ross | G06F 21/41 |
| 2020/0007554 A1* | 1/2020 | Vincent | G06F 21/31 |
| 2020/0065016 A1* | 2/2020 | Jiang | G06F 3/0641 |
| 2020/0067778 A1* | 2/2020 | Kothari | H04L 41/5025 |
| 2020/0186574 A1* | 6/2020 | Amin | H04L 45/304 |
| 2020/0293502 A1* | 9/2020 | Tal | G06F 16/27 |
| 2020/0387794 A1* | 12/2020 | Baker | G06N 3/084 |
| 2020/0410295 A1* | 12/2020 | Baker | G06N 20/00 |
| 2021/0019296 A1* | 1/2021 | Petersen | G16H 20/10 |
| 2021/0027163 A1* | 1/2021 | Baker | G06N 3/045 |
| 2021/0117792 A1* | 4/2021 | Ahuja | G06N 3/045 |
| 2021/0133193 A1* | 5/2021 | McConnell | G06N 20/00 |
| 2021/0194703 A1* | 6/2021 | Queralt | H04L 63/0815 |
| 2022/0012564 A1* | 1/2022 | Zjajo | G06N 3/08 |
| 2022/0058467 A1* | 2/2022 | Baker | G06N 5/01 |
| 2022/0108171 A1* | 4/2022 | Puigcerver i Perez | G06N 3/08 |
| 2022/0141187 A1* | 5/2022 | Biradar | H04L 63/0218 726/11 |

* cited by examiner

COUNTING MACHINE FOR MANUFACTURING AND VALIDATING EVENT-RELEVANT IDENTITIES VIA AN ENSEMBLE NETWORK

RELATED APPLICATIONS

There are no previously filed, nor currently any co-pending applications, anywhere in the world.

BACKGROUND OF THE INVENTION

1. Field of the Invention

The present invention relates generally to a system and method for verifying and managing digital identities and, more particularly, to a system and method that provide both proof and confidence levels of identity at a given moment across a diverse set of cooperating but otherwise unrelated enterprises requiring trusted digital identities.

2. Description of the Related Art

Identity is pervasive, and digital identity in particular is taking center stage in our society. As the eminent mathematician and philosopher Willard Van Orman Quine so succinctly and famously put it: "No entity without identity". Further, read the following quote from Reference (1), listed below in Non-Patent Citations, from a respected academic journal (Journal of Network and Computer Applications, June 2020):

"Digital identity plays an increasingly important role in our interconnected, digitalized society. For example, most of us have a number of digital identities, associated with our workplace, our personal life, and other professional-related activity(ies). This partly contributes to the growing reliance on identity information management (also referred to as identity management, identity management and access control, etc., in the literature), designed to manage and secure our identity information and to provide relevant services.

Identity management solutions are generally designed to facilitate the management of digital identities and operations such as authentication, and have been widely used in real-world application."

The current state-of-the-art, as represented in part by the Patent Citations presented below, centers on mechanisms for ID verification that involve two participants, with an optional third participant(s). These include:
(1) The entity whose ID is to be verified; this entity initiates the process by presenting for review and investigation various credentials, facts, and (optionally) supplies replies to various questions and meets various challenges, along with implicitly or explicitly allowing (i) various aspects of their personal transactional and/or behavioral history to be analyzed, and (ii) various aspects of their personal biometrics to be gathered and analyzed.
(2) The organization that verifies the ID, undertaking the reviews, challenges, investigations, and analyses just described.
(3) A second organization, trusted by the primary organization just described, that contributes to the primary organization additional facts that assist the primary organization in this verification, or, by extension, an additional organizations that individually contribute such facts.

However, heretofore unrecognized by current skilled practitioners, limitations inherent in these approaches have lead to the present invention, the development and deployment of a counting machine for significantly improving existing identity management applications without requiring those organizations running such applications to make major changes to the applications.

In particular, the present invention removes the constraining structure of the entity interacting with the primary organization, and the primary organization interacting with the confirming organization(s), in two essential ways:
(1) although the present invention involves multiple organizations, they are acting as contributors but not peers; the result is not a consensus, but a data fusion, and even though the primary organization might be considered as the one originating the request for digital identity verification, this originator does not otherwise have an elevated stature in the development of the fused answer, and
(2) the present invention allows the choice of either a standard (the primary organization is presented with credentials by the entity) or an inverted data flow (the primary organization presents its credentials to the entity first).

This invention fulfills a long felt need for:
(3) the creation of a unique identity (typically, but not exclusively represented digitally) for each entity that is widely shared, accepted, and changes dynamically over time with respect to two crucial measurements we are about to discuss, and
(4) the creation of both trust scores and confidence scores, with trust measuring the degree to which it is believed that the identity proffered by an entity is in fact correct, not faked, stolen, or otherwise confusable with the identity of some other entity (whether by design—fraud—or accident—identical name, photo of a twin, etc.), while confidence measures a level of certainty of the conclusion, given the inherent reliability of the measurements and investigations undertaken, and the skill/reputation/history—learned through experience and testing—of the organizations so undertaking.

With regards to (4), it should be noted that it is a fundamental tenet of statistics and econometrics that all measurements, even measurements of probabilities, have an associated additional measurement of the primary measurement's uncertainty. It might seem paradoxical or circular to say "we estimate a probability of 90% that some event is happening or some fact is true, and we are 80% sure of that estimate". But it is neither paradoxical nor circular. More sophisticated analyses can actually produce a probability distribution, or similarly a confidence interval, around the probability estimate, but having at least a second measurement of the uncertainty probability is the minimum requirement. It is a basic theorem in econometrics that these two measurements cannot be successfully combined into one.[1]

[1] See Reference (2), listed in Non-Patent Citations, from the respected academic journal *Econometrica*.

Some methods and devices are known that incorporate various mechanisms for managing identity verifications. For example:

U.S. Pat. No. 9,721,147 discloses a "Digital Identity"; however this teaches combining two factors only.

U.S. Patent Publication No. US2007/0055887 discloses a Digital Identity Management which teaches developing a common API across services, but does not teach a fusion of results.

U.S. Pat. No. 8,224,753 discloses a system and method for identity verification and management which teaches using summing function and a threshold for merging results, but not machine-learning based fusion. Of particular note from these teachings is that summing and averaging will often produce highly inaccurate merged results.

U.S. Pat. Nos. 11,010,803 and 8,966,602 discloses identity verification and authentication and collectively teach bi-lateral (organization and entity) identity verification, but uses only one probability score.

U.S. Pat. No. 9,189,788 discloses a System and Method for Verifying Identity that teaches using multiple methods for verification, but uses only one probability score.

U.S. Pat. No. 10,325,084 discloses systems and methods for creating a secure digital identity and teaches blockchain storage of identity verification information, but requires a specific and deliberate initiation action by an entity: the digital signing of a public key. Transactions which an entity enters for commercial service(s) but require identity verification and undertake that without further action on the part of the entity are not covered.

U.S. Pat. No. 10,404,675 disclose elastic authentication system that teaches accumulating information on an entity over time, potentially both before and after a particular transaction, but does not teach the use of a pooling cooperative network, nor the use of trust and confidence scores.

It is worth noting that there are literally thousands of granted U.S. patents on methods for identity verification. U.S. Pat. No. 9,721,147 lists 930 patent citations, and the listing stops chronologically several years ago. This invention is not concerned with particular methods for identity verification, rather it depends on the existence of a robust ecosystem and marketplace-based infrastructure for identity verification technology to provide the fuel for its ensemble pooling approach—the existence of thousands of patents and the rate-of-growth of such filings are a plus, evidence that the universe of possible methods is vast and in fact expanding.

SUMMARY OF THE INVENTION

It is thus an object of the present invention to provide a system and method for creating an event-related two-part identity that includes a trust component and a confidence component.

It is a further object of the present invention provide such a system and method that provide both proof and confidence levels of identity at a given moment as represented, managed, shared, and used across a diverse set of cooperating but otherwise unrelated enterprises requiring trusted digital identities for the successful operation of their individual and differing missions.

It is a feature of the present invention to create the identity through the integration and iteration of historical and current third-party data plus additional behavioral and emotional data obtained and then fused over an ensemble network.

The present invention provides a counting machine for manufacturing and validating event-relevant identifications ("IDs"), tagged with both Trust and Confidence Scores, for Specific Entities (Individuals and Enterprises) and their Prosoponyms using a Managed Secure-Immutable-Non-reputable-Replicated-Verifiable and Fault-Tolerant Distributed Datastore via an Ensemble-Based Network of both Existing and Newly-Created Heterogenous Single- and Multi-Factor ID Validation Services. The ensemble network consisting of both Commercial Organizations (known as Members) requiring valid Entity IDs for use during various events, such as purchase transactions, and Service Providers (known as Partners) who supply technology services for ID validation (as standalone services or as licensed by Members). Acquisition of all data is obtained digitally, including both data of the type that has been created digitally, and data of the type that was created physically but has been digitized to produce a digital version, over the ensemble network.

The present invention acts as an intelligent gateway to the validation, verification and trusted confidence values of an entity (an individual person or organization) for each type and level of identification needed. Utilizing a distributed network and a peer-to-peer blockchain system on a combination of distributed and centralized systems, rules and preferences of the type of validation, as well as the results to process, may be implemented, checked and cross-checked concerning the identification of an entity.

Identity is the knowing of who or what an entity is and, as such, the present invention identified and verifies a combination of multiple aspects of the entity, and not merely the type of access, or privilege that is presented.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present invention, the term EARLI is an acronym for "Event Associated Record Linking Identities". This is an assemblage of the information pertinent to a particular identity-verification transaction, containing not only the asserted purported identity, but all the supporting data. Its creation (and submission to the ensemble network) marks the start of the transaction (the request for identity verification), and it evolves as the transaction proceeds, as additional supporting data becomes available, is supplied by network participants, etc.

For purposes of the present invention, the term HAD-ENUF: "Hasse Diagram Ensemble Unified Fusion" describes the counting method that implements a supervised machine-learning approach to the ensemble data fusion procedure needed to arrive at the ultimate answer for any validation query (EARLI) submitted to the network. It automatically evolves and updates the counts used as the process of identity validation proceeds. (The Hasse Diagram is the graphic representation of the natural partial order induced via factor-by-factor comparison across servers producing scores. For example, if server A says Entity X gets scores 0.5, 0.5, and 0.5 on three factors, then that "dominates" server B who gives scores 0.4, 0.4, 0.4, but does not dominate—hence the term "partial" in "partial order"—the scores of server C who gives scores 0.6, 0.5, 0.4. In practice the situation is more complex, since not all servers give scores for all validation factors.) "Factors" here refers to specific identity-verification data points for identity-verification methods that are implemented by more than one identity-verification service (three different facial recognition systems, for example, and four different voice print systems, etc.), as well as overall trust and confidence factors. HAD-EN UF implements the stopping rule that ends the circulation of the EARLI among ensemble network participants, signifying the final verification result has now been successfully computed.

For purposes of the present invention, the term MyD is used as phonic paranomasia with "ID", meaning identity, in particular your (the entity's) identity. MyD is the actual durable instantiation and representation of the identity for a particular entity provided by the present invention, as determined by the ensemble. It can be digital or physical, and should be considered dynamic, i.e., able to be updated in real time.

For purposes of the present invention, there are two types of entities to which a MyD may be assigned. These include individual entities (real persons or organizations) who have signed up and agreed to have a MyD issued, and are on-boarded as Subscribers, as well as individual entities that have not taken any steps to sign up, in fact are not required to give consent nor even be necessarily aware that they are being assigned a MyD. As used herein, organizations are non-individual juridical entities; such organizations may include corporations, government agencies, NGOs, non-profits, institutions, associations, etc., all of which may have a MyD assigned. Further, a Member is an organization that has joined the ensemble network (and may be required to pay a fee and be a customer of the network) in order to effectuate validation and issuance of a MyD. Members are typically the type of Organizations that require, for the success of their mission, large volumes of identity verifications, both new and updated, on large universes of Entities (both Individuals and other Organizations).

For further purposes of the present invention, the term Partners may be defined as those Organizations, most likely commercial, that offer services (via the cloud, via on-prem licensing, etc.) that provide some proof of entity identities through any viable, reliable means (e.g. Biometric, Behavioral, Challenges, etc.), who have signed agreements (with varying commercial terms) with a Governor (defined as the central operating authority of the ensemble network) and that lets their services be used (and potentially re-sold or licensed) on the ensemble network of the present invention. Such usage is subject to various terms-and-conditions that might vary based on the Member accessing the services. It would make sense to codify the commercial relationships between Partners and the ensemble network via an Affiliate Program, with levels: e.g., Level 1 for partners who provide service on the network or on-prem installations; and, Level 2 for those that re-sell these services.

For purposes of the present invention, the terms Subscriber, Members, Partners, Entities, Governor are to be broadly construed as the participant and actor types in the present invention's ensemble network. Members are organizations, typically commercial or governmental, that need identity verification on entities (which can be individuals or organizations). Partners are providers, typically commercial, of identity verification technologies, products, and services, but do not typically need themselves to have identities validated. Members may develop and deploy their own technologies, license the technologies of Partners but run the technology implementation on their own, or use Partner-provided services. Our ensemble network architecture handles all three situations. The Governor is a central authority not for providing identification services, but for running the network and developing message routing rules.

For purposes of the present invention, the term ICE-T means "Identity Confirmation by Entity Ticket" and should be broadly construed as a request for identity verification that is initiated by the entity, not the organization that requires the entity to supply its identification. This can be submitted by an entity simply because the entity wishes to be "known" to our ensemble and have a MyD assigned to it, or because in a particular transaction it might be more convenient for the entity to initially and immediately ask to have its identity verified, instead of initiating a transaction normally (by requesting a service) and then responding to the organization's request for identity proof (in other words, starting a transaction by showing your identity). An analogy is this: walking into a tavern and preemptively presenting your driver's license for the bartender to see, as opposed to walking in and ordering a drink, then being "carded" by the bartender who needs to ascertain that you are of legal drinking age. An ICE-T generates a special type of EARLI, which in this case might not have an originating organization.

For purposes of the present invention, the term TRIP means "Transaction Relevant Identity Prosoponym", and it should be broadly construed to include variations on it, including F-TRIPs and C-TRIPs (Fraudulent and Confusable names). These are the collection of names associated with a particular entity, as assembled over time, and stored, during and after the process by which a MyD is being developed for the entity.

Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Figure 1:
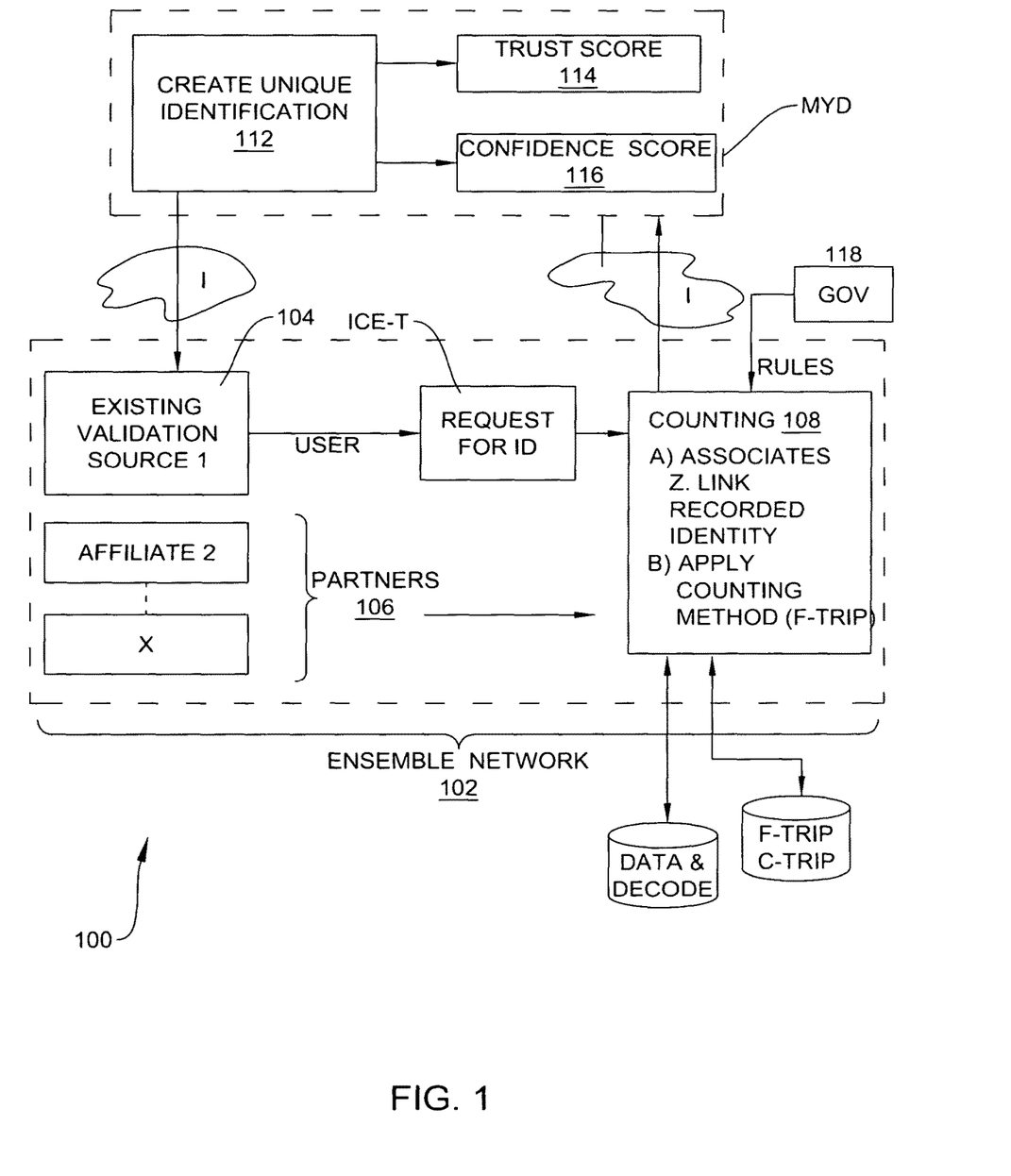
FIG. 1 is a schematic showing, generally, an overall operation for a system that provides both proof (via trust scores) and a confidence level for such proof of identity at a given moment according to a preferred embodiment of the present invention.

Referring now to FIG. 1, a system is shown that provide both proof ("trust score") and confidence levels of identity at a given moment ("system"), generally noted as 100, according to an exemplary embodiment of the present invention. The system consists generally of an ensemble network 102 of members 104 and partners 106 in communication with a counting machine 108 to create a MyD 110 that can be communicate to the requestor (a member or entity) 104 in real-time. The MyD 110 provides a unique identifier 112 that includes a trust component 114 and a confidence component 116. A governor 118 provides operational control of the counting machine 108. As should be apparent to those having ordinary skill in the relevant art, in light of the present teachings, the system 100 is shown herein as an exemplary roadmap for further teaching and explaining the present invention in greater detail below. It is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 2:
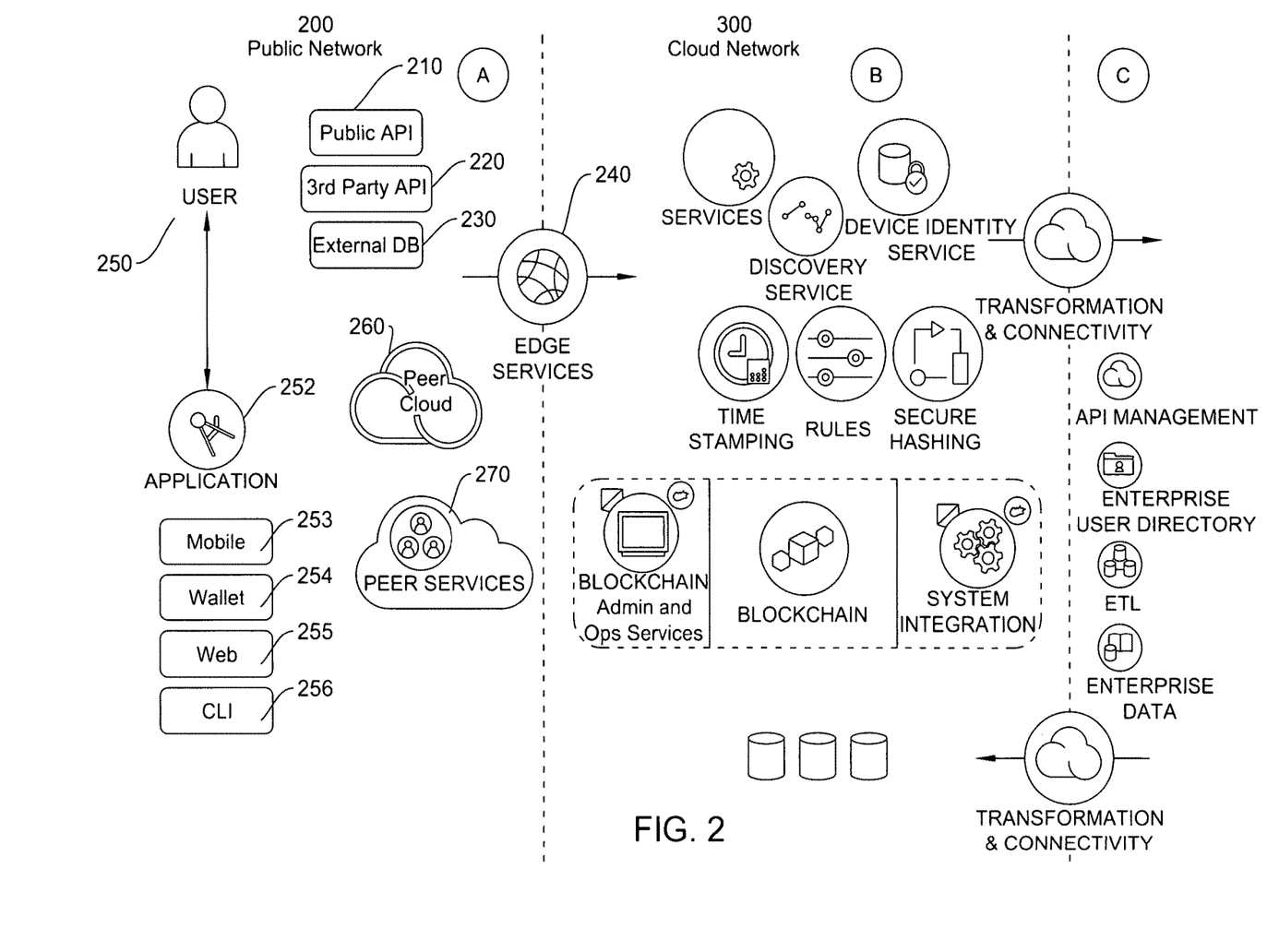
FIG. 2 through FIG. 3 are schematics for a network structure for use therewith.

Referring in conjunction with FIG. 2, a network structure for the system 100 is described in greater detail. The network may comprise an ensemble network in which a public network element 200, a cloud network 300 and an enterprise network 400 are in operational communication The ensemble network invention may include both centralized and federated identity verification services in a manner to provide an ability to pool the identity-verification abilities of potential competitors. Various application programming interfaces (API's), such as a Public API 210 or a third party API 220, as well as one or more external databases 230 may communicate through a gateway 240 from the public network 200 to the cloud network 300, which is a software intermediary that allows two applications to talk to each other to allow requests for identity verification from a User 250 or a peer cloud 260 or other peer services 270. It is believed that peer organizations that would not normally cooperate directly (example: Verizon and T-Mobile may not share validation information to each other directly) will communicate through a proprietary gateway 240 to access a cloud network 300 that may use shared information from each to create a MyD 110, while not sharing any provided information directly between competitors. Using the present invention, various partners 106 or peers may enjoy beneficial use of their own, and each others, information in a controlled and confidential manner.

Such controlled cooperation may also be elastic, since the type of cooperation can and does change with circumstances and, in particular, can be adjusted depending on parameters of the entity being evaluated. By way of example, and not meant as a limitation, Verizon may be willing to work with T-Mobile on identity verification for most customers, for example, but not for high-worth individuals or large-spending customers. Similarly, individual and business accounts may form another such division in the information willing to be provided and shared.

Figure 3:
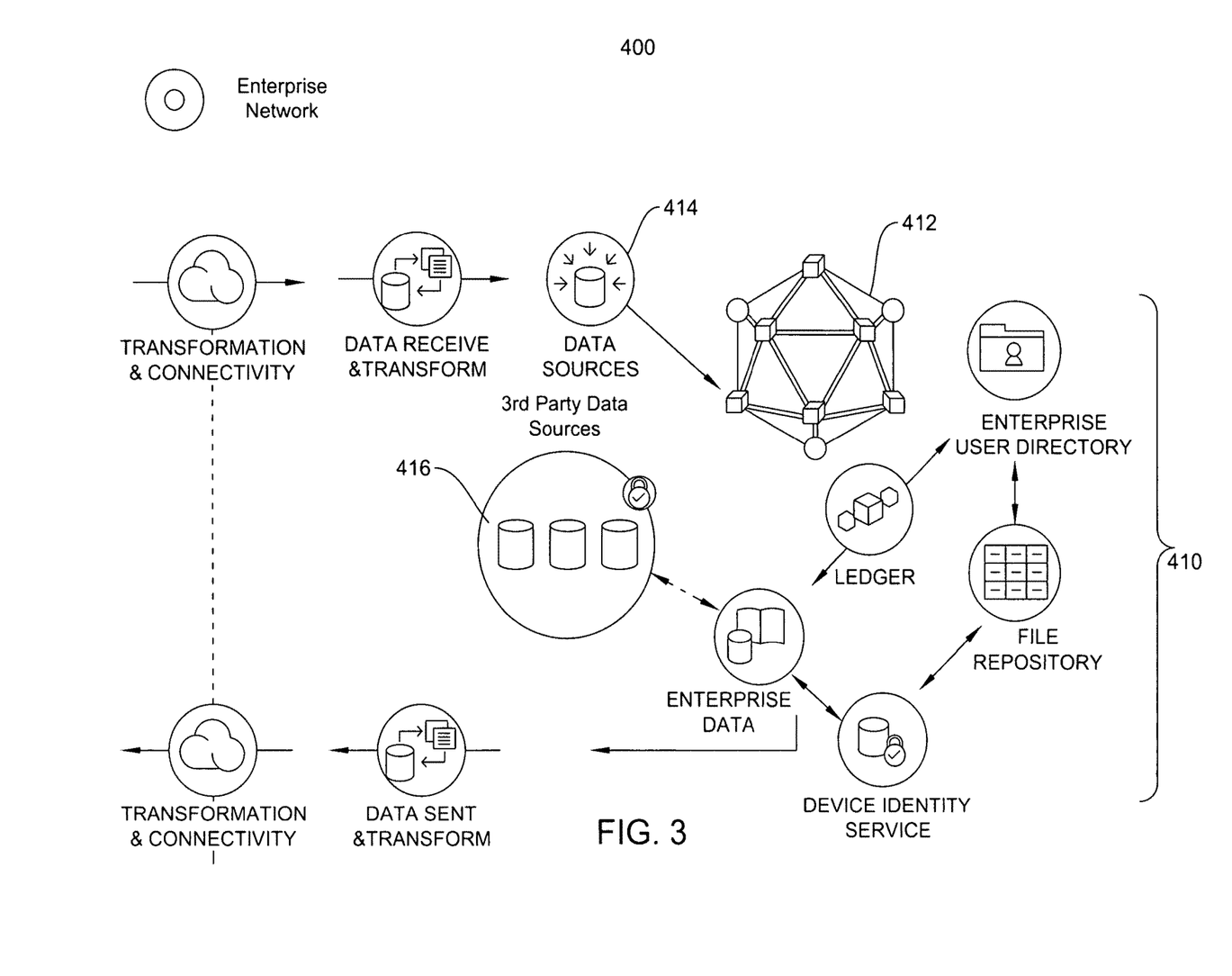

As further shown in conjunction with FIG. 3, while the cloud network 300 may provide the counting machine 108 for the manufacturing and distribution of a requested MyD 110, the application of the counting methodology (ERLI, BIN-NEAR, and HAD-ENUF) and association and linking of recorded identity information may be accomplished by communication with various data sources from the enterprise network 400.

Figure 4:
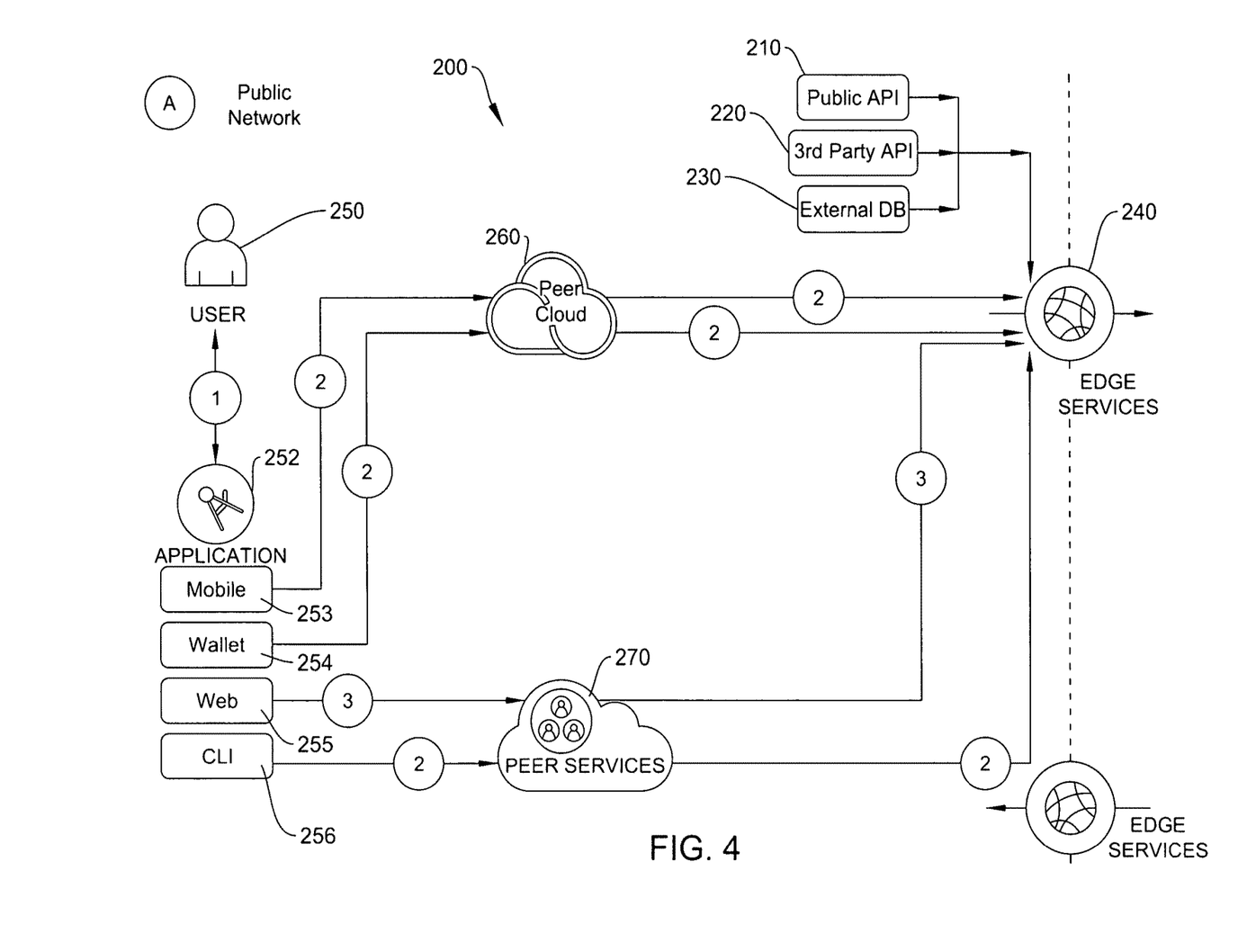
FIG. 4 is an exemplary flow diagram of the operation of the public network 200.

Referring now in conjunction with FIG. 4, the operation of the public network 200 is shown in greater detail. Here a user of the network (a Member or an entity) 250 may initiate 1 a request for validation of an identity 2 through an application 252 that may be a mobile application 253, a wallet application 254, a web application 255 or a command line interface (CLI) or other type of API or remote-procedure-call (RPC) 256. A mobile application 253 or wallet application 254 may make the request 2 through a direct peer-to-peer cloud 260. A web application 254 or CLI/API/RPC application 256 may make the request 2 through a peer based program 270.

Figure 5:
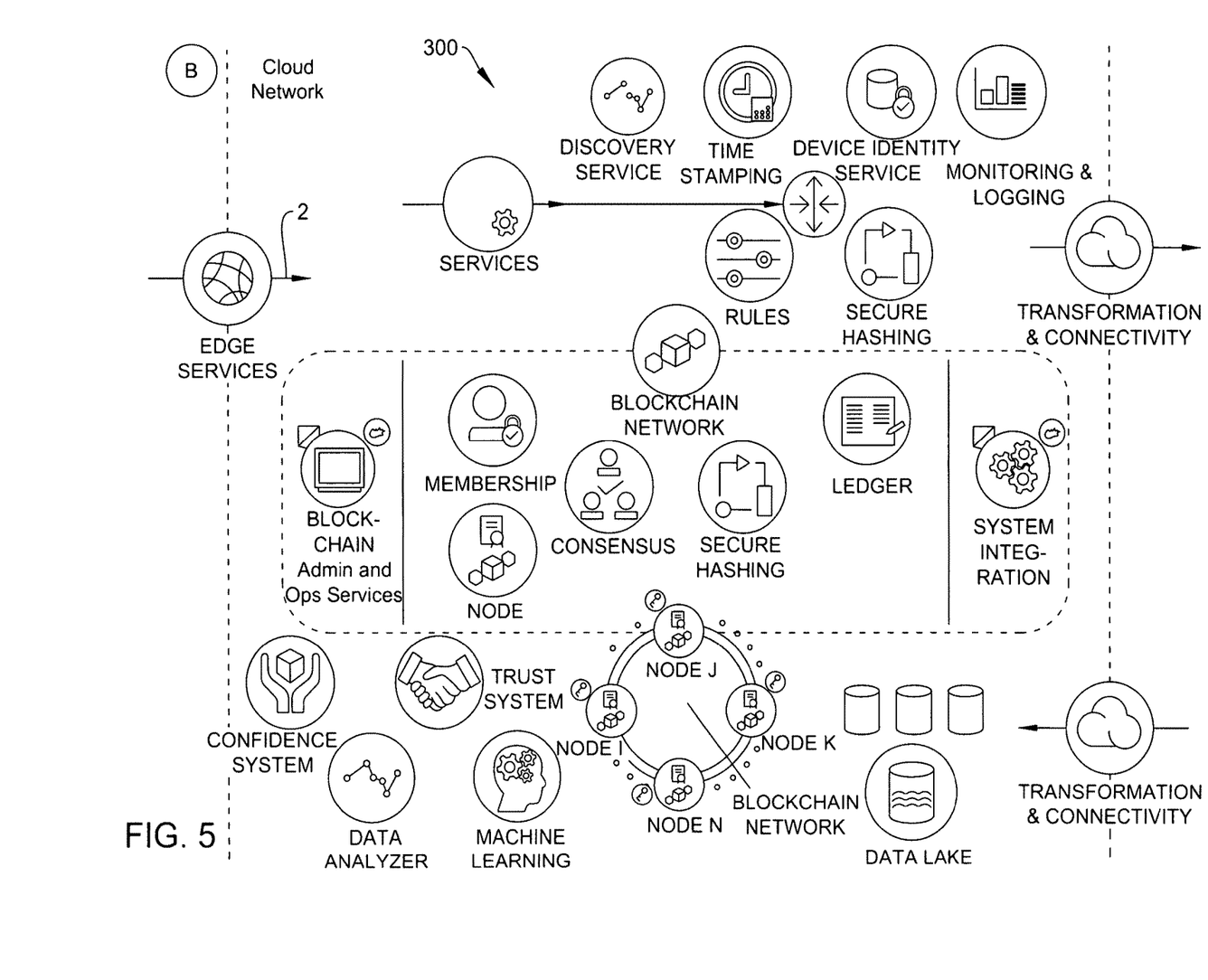
FIG. 5 is an exemplary flow diagram of the operation of the cloud network 300 for use therewith.

Referring now in conjunction with FIG. 5, the operation of the cloud network 300 is shown in greater detail. Here the request 2 for validation of an identity causes the issuing an EARLI on a new Entity, or a current Entity, which is processed by Members and Partners participating in the ensemble network. An entity's request for getting a MyD 110 issued to is through submitting an ICE-T. The data flow of the EARLI is controlled by BIN-NEAR, until HAD-ENUF says "stop" and computes the final answer. The Entity's TRIP values are created or updated as appropriate.

Figure 6:
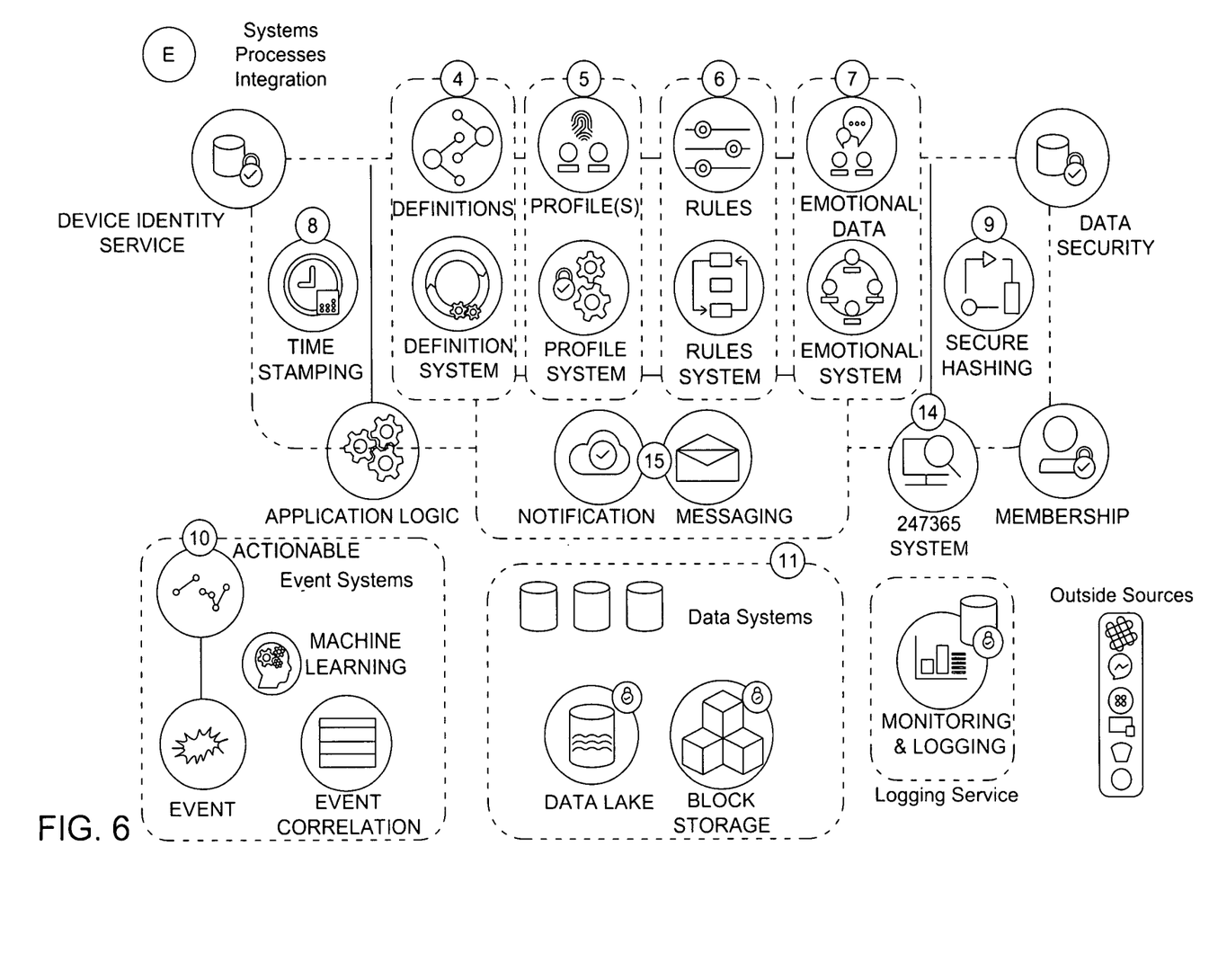
FIG. 6 is a flow diagram for the systems processes integration for an Event Associated Record Linking Identities for use therewith.

As best described in conjunction with FIG. 6, the issuing of an EARLI on a new entity integrates various data sources to create an identity recognition. Such data sources may include all conventional data sources such as real-time biometric authentication, multifactor process, and other currently available methods, like documents which prove access to privileges such as a driver's license or passport, with available biometrics. Further, various data from existing, standard documents may also be used, such as driver's license, passport, National ID, Social Security card, Know Your Customer/Anti-Money Laundering (KYC/AML) filings, etc., either read via OCR or from an MRZ. Such documents may be cross checked and compared to known/stored data, including known frauds data. The recentness of such cross check (last checked, last updated) and indications on known sanctions lists may be further obtained in order to assist in computing the confidence score. GPS location of the identification request is an additional datapoint that is often available as well. Such data is aggregated from available sources, including Member and Partner sources, and is accumulated and enhanced over time in conjunction with emotional metrics and behavioral metrics unique to the individual, accumulated and enhanced over time. Although biometrics, such as optical or fingerprint scans are direct, they are susceptible to hacking & fraud. MyD is able to combine the latest available biometrics and the emotional behavioral understandings of an individual to create another layer of proof. Biometric attributes of a person may be obtained to identify the unique features of a person and use those to create a viable match, within a certain measurable level of acceptance. Examples of the potential unique factors of an individual include: Fingerprints; Iris Scans; Retinal Scans; Facial Recognition; Voice Recognition; Palm Veins; Skin Texture; Palm Prints; Hand Geometry; Gait Analysis or DNA. In conjunction it is often beneficial to validate such data with a test for liveness, such as some indicia of movement, a triggered response from prompt, the creation of a contemporaneous "selfie", identification of a blink or smile or the like. The platform generates a community of Members around the particular entity being identified that provides further validation and verified proof of the entity, which improves trust. With the dynamically evolving rules and matching engine, through the network of validation and verification nodes, MyD provides the next generation of identity solutions. MyD provided as a service, operates on a distributed node, and centralized validation network. MyD provides validation and verification confidence levels, which are applied by Members to save effort and money, reduce fraud and identity theft, providing Members the ease and confidence to perform their desired transactions.

In order to calibrate a confidence level for a particular MyD, for entities that are individuals the emotional and behavioral systems look at as much information as possible in order to make the most accurate assessment of the individual. Aspects of the Behavioral Biometrics and Behavioral Emotion Assessment are not an attempt to re-create how biometrics work, nor intended to create new databases of facial or speech examples. There exist such databases, and these can be used as part of the comparison. By utilizing all available identifying characteristics, this allows for concentration on the parts that are needed which are processed by capturing, comparing, logging, and learning such identifying characteristics, and repeating these steps over time.

The identifying characteristics may be classified into a few different types. Facial Emotion is the type most publicly available, with emotion databases including posed facial expressions only. In some posed expression databases, the participants are asked to display different basic emotional expressions, while in spontaneous expression database, the expressions are natural. The goal of the present invention is to fuse the information between among such databases, recognizing Posed-vs-Expression Type data. Speech Emotion produced in a state of fear, anger, or joy becomes fast, loud, and precisely enunciated, with a higher and wider range in pitch, whereas emotions such as tiredness, boredom, or sadness tend to generate slow, low-pitched, and slurred speech. This allows the ability to look upon the differences pitch, speed/rate, intonation, stress, and rhythm and attain subjective categorization to identify categories to place these samples in (e.g., 'anger', 'approval', etc.) All of this is accomplished thru analyzing pattern recognition through many characteristics, such as accent, pitch, contour, lowering, rate, frequency, breathiness, loudness, pitch and pause discontinuity. In addition to such audible characteristics, visual emotion may also be observed. Observational assessment useful in identification and quantification include fear, anxiety and avoidance. Additionally, gestures may be efficiently used as a means of detecting a particular emotional state of the user, especially when used in conjunction with speech and face recognition. Closely related to gestures are physiological signs, such as gait.

In integrating and fusing data from these various sources, numerous algorithms and classifiers may be implemented to provide a determination methodology. These may include, inter alia, artificial neural networks (ANN and "deep learning"), Naive Bayes (NB) classifiers, decision tree algorithms (CART, ID3, C4.5, C5.0/See5). hidden Markov models (HMMs), k-nearest neighbor algorithms (k-NN), support vector machines (SVM), linear discriminant classifiers (LDC) and Gaussian mixture model (GMM). Utilizing one or more of such methodologies, expected decision accuracy of 70 to 85% or more may be obtained, versus the typical human accuracy of (approximately) 60%.

Further, such analysis may be performed based on actions and responses to a particular event. By applying emotional understanding to a given event, the actions and responses may be classified to an emotional output. This is done by extracting meaningful patterns and applying an inference engine to create assumptions, and compare and finally predict possible outcomes.

This process may be iterated and compared to the previous outcomes in order to validate the assumptions and modified to incorporate changes. By way of example, the following narrative may be exemplary of this process.

1. The user is challenged with a with a pop-up question;
2. The user's facial expression is captured. A facial expression such as the furrowing of their brow, could be tagged as appearing "confused", or as "concentrating", or even as "possibly negative". This could be compared with the opposed reaction of a positive expression such as if they were smiling in a happy-looking way.

The essential and effective differences between the present invention's fused-data ensemble network with the combination of centralized and federated identity verification services are now clear. The present invention gathers strength from its ability to pool the identity-verification abilities of potential competitors. Organizations that would not normally cooperate on anything (example: Verizon and T-Mobile) can, using the present invention, enjoy beneficial but nonetheless controlled and confidential cooperation, cooperation that is also elastic, accommodating a variety of commercial concerns that may in fact change over time and varying circumstances.

Figure 7:
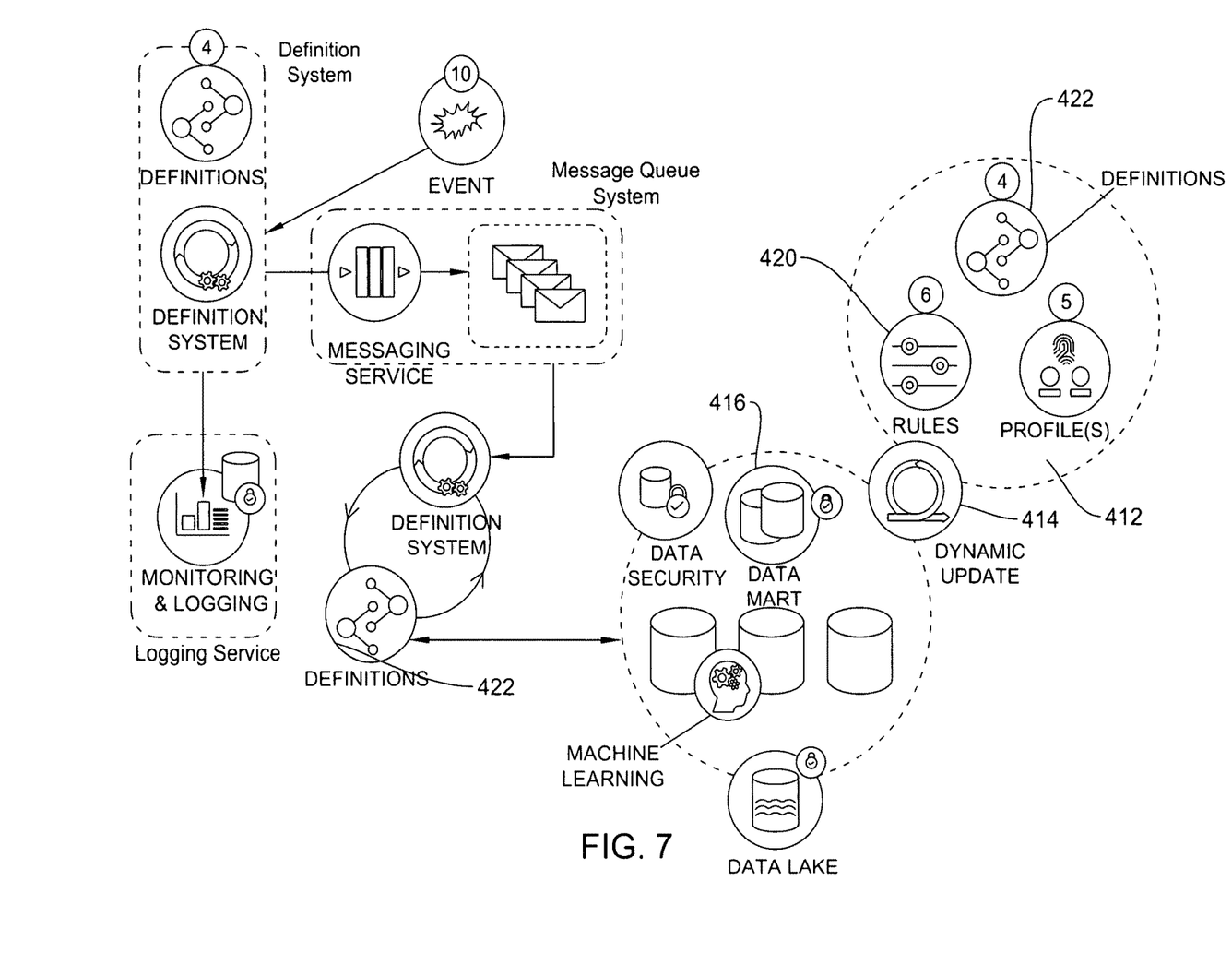
FIG. 7 is a schematic of a profile system 412 for use therewith.
Figure 8:
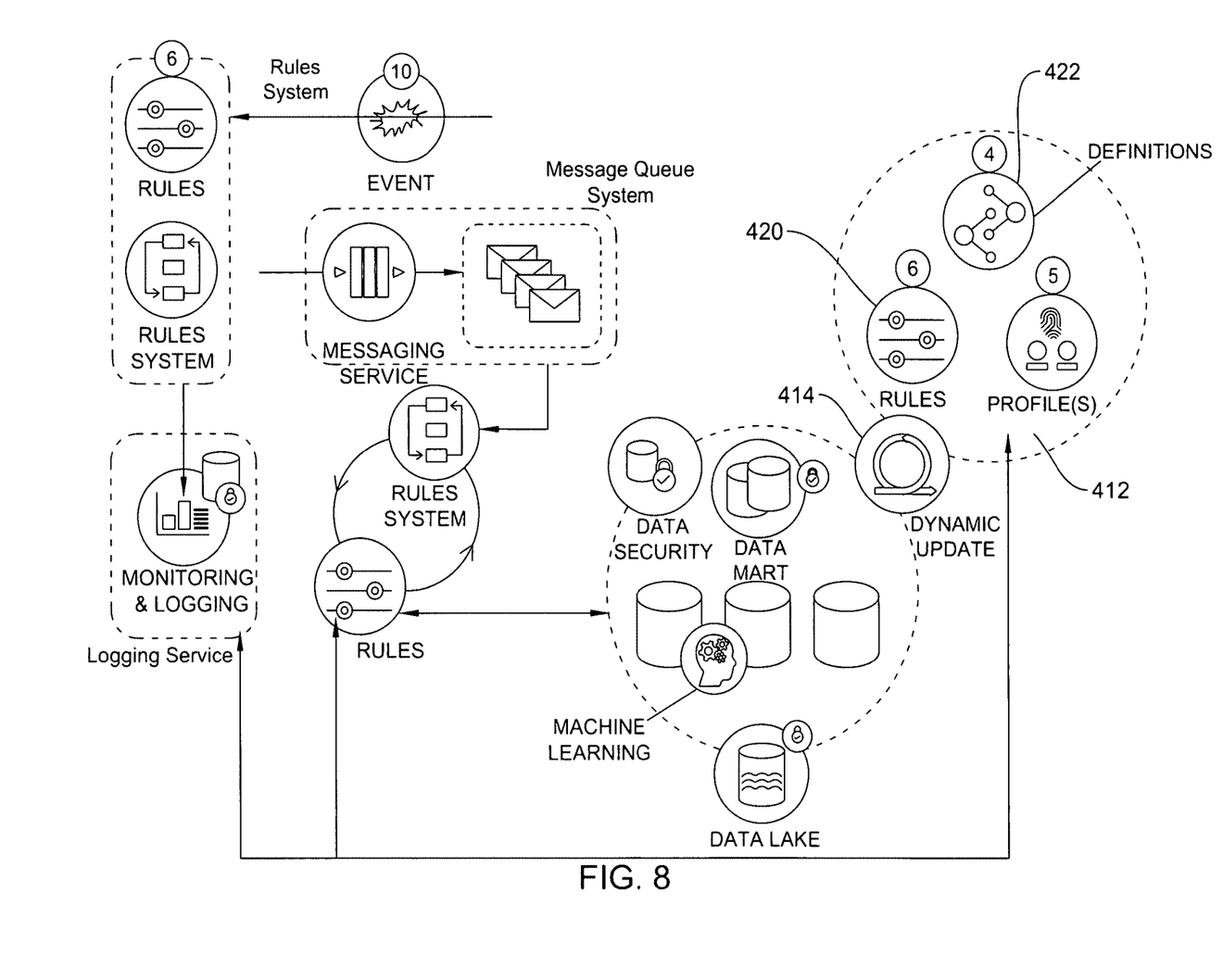
FIG. 8 is a schematic of a rules system 420 for use therewith.
Figure 9:
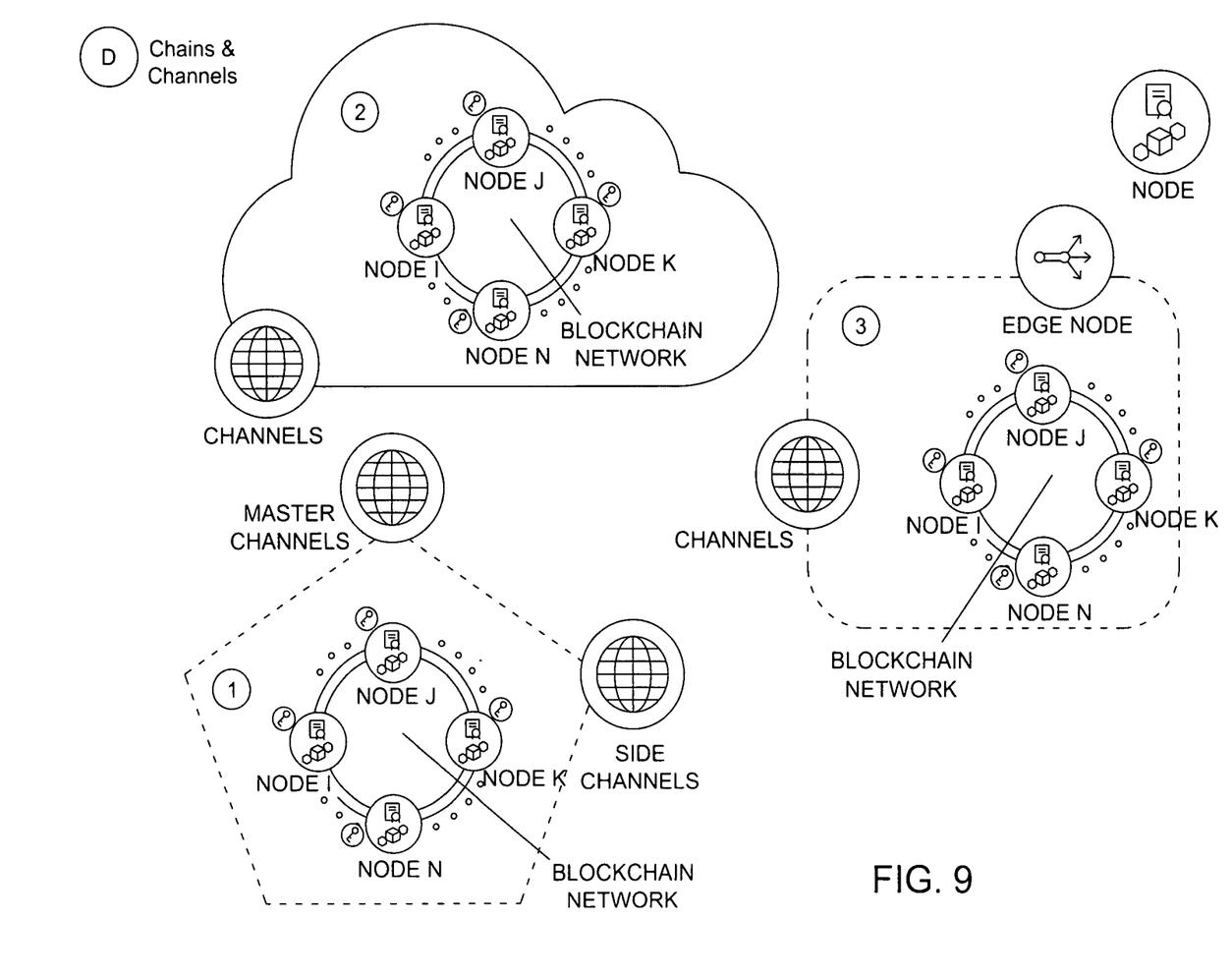
FIG. 9 are schematic of blockchain channels for use in conjunction with the preferred embodiment of the present invention.

Referring best in conjunction with FIG. 3, FIG. 7 and FIG. 8, a storage system 410 is best shown that houses the information and understanding of a entity and provides inputs and outputs through the enterprise network 400. A profile system 412 interacts with the core of many other systems 414, creating value from ordinary data 416. Interaction with the Rules 420, along with what are the preferences for using these specific definitions 422 allows the system to take on a more elastic, fluid-like design and created a dynamic evolving rules and matching system. The dynamic evolving rules and matching system creates a realistic profile designed around the unique traits of the entity. These characteristics are matched with a confidence solution that measures accuracy as well as deviation within an acceptable limit, using a dynamic process (based upon learning rules) for comparison. Combined with the traits of the entity, and a learning model over time (LMOT), of these traits, a unique confidence score is computed that can provide a level of validation of the entity's identity verification. This confidence score is a dynamic score that is then used to provide the comfort that the entity that is being presented is in fact that entity it purports to be.

The Matching System is made up of profiles, rules, preferences, definitions and the confidence measurement system. These components with the (LMOT), and additional behavioral traits, create a dynamic scoring system that can provide the assurance needed to mitigate risk. Metrics may be supplied to the rules to allow a type of level of acceptance for access, and based upon the output scoring results can accept, require more, or just reject based upon evidence.

Ultimately, the preferred embodiment of the present invention provides an identity trust solution, offered as a service, where a Governor provides validation of an entity's digital identity on behalf of a Member's request. The entity's digital identity is provided in real-time in the form of the creation of a MyD (either physical or digital) or the validation of an existing MyD the along with the trust (proof) and confidence level in that trust that they are who they say they are, at that moment. This is accomplished by tackling the root problem of identity, which is identifying the entity for being the entity, taking a whole-of-available-evidence (and fusing potentially varying degrees of information) rather than inferring it from single sets of specific documents. As a result, MyD provides a measurable Trust Score for the identification, similar to the credit rating process, along with a Confidence Score in that Trust.

This is done using multi-factor processes integrated with the proprietary data fusion processes to generate a MyD determination (new MyD issuance or existing MyD validation) in real time. Working with currently available methods, like documents which prove access to privileges such as a driver's license, corporate certificate, or passport, with biometrics if available, the MyD is also aggregated with AI-based behavioral and emotional metrics unique to an entity when that entity is an individual, all accumulated and enhanced over time. Although biometrics, such as optical or fingerprint scans are direct, they are susceptible to hacking and fraud. Thus MyD combines the latest available biometrics and the emotional behavioral understandings of the individual, when the entity is an individual, to create another layer of proof. The platform utilizes a community of Members focused on the particular entity being identified that provide further validation and proof of the entity, which improves trust over time. With the Dynamically Evolving rules and matching engine, through the network of validation and verification nodes, MyD provides the next generation of identity solutions. MyD provided as a service, operates on a distributed node, and centralized validation network. MyD provides validation and verification confidence levels around the Trust Score, which saves effort and money, reduces fraud and identity theft, providing Members the ease and confidence to perform their desired transactions.

By way of further explanation, it may helpful, by comparison, to briefly describe what the present invention does not perform. The present invention is not intended to recreate existing recognition biotechnologies or data bases, such a facial or voice print. Rather, it is intended to aggregate use of various databases against which identity is verified. Databases such as NCIC, Equifax, FICO, IBM, Amex includes data already linked to an entity, and are important to help with MyD's confidence scores and trust values. There are also various forms of identification that may be used, including passports, driver's license, birth certificates, credit cards, corporate ID cards, etc. However, this third party data may be used, not captured, in an enhanced use with combination of other factors to help produce the confidence score for the trust value for each identity verification.

It is the algorithmic integration of existing sources and additional emotional and behavioral datasets that allow for the generation of a "confidence score" and "trust score". Such a determination adds the element of how confident an application can be in the MyD determination of trust (in a particular identify verification) based on the congruity and alignment of the parts that make up the whole picture of information developed. With the addition of emotional recognition systems, a confidence score in an identity validation trust score can be made even higher or, alternately, for a request for further information can be initiated if needed to obtain a confidence score threshold high enough as predetermined to be required for the particular validation request and resulting trust score.

2. OPERATION OF THE PREFERRED EMBODIMENT

In operation, an electronic device determines, based on an entity profile item, a first list of entity profile attributes. The electronic device filters the list of entity profile attributes, based on data associated with the entity, to generate a second. final list of entity profile attributes. Entity profile attributes in the second. final list are associated with respective attributes that can be ascertained or measured. The device determines values for one or more of the entity attributes and generates a ranked list of entity profile items based on the second, final list of entity profile items, including determining a degree of correlation between the respective attributes of the respective content items of the second list content items on the device, and the value of the one or more physical parameters of the entity if these are available. The device provides, using the ranked list of content items, one or more second content items from the second list for use for entity identity verification.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

We claim:

1. A counting machine comprising:
   a set of counters, each of which keeps a current count, said current count initialized at the value zero and incrementing whenever a signal in the form of a data record is received by the counters;

said set of counters comprising more than one mechanical, electrical or digital counter arrayed in a distributed network with each said counter connected such that said incrementing accumulates a number of non-duplicative said data records;

said data records selected from a group consisting of:
an entity identification verification from a physical or digital data record containing an asserted purported identity of said entity;
a supporting information about said entity submitted to the distribution network by a network participant; and
users/appliers (referred to as Members) of identity validation services who also have their own data relating to said entity's identity; wherein the count of the counting machines is modified as the transaction proceeds, as additional supporting data becomes available and is supplied by network participants; wherein the counting machine utilizes a counting methodology, said counting methodology selected from a group consisting of:
EARLI (Event Associated Record Linking Identities), an assemblage of information pertinent to a particular identity-verification transaction, initiated upon receiving a request for validation of an identity validation, engaging Members and Partners in an ensemble network to control data flow for entity identification verification and supporting information processing;
BIN-NEAR, a mechanism that guides the data flow controlled by EARLI until a stopping condition is indicated by HAD-ENUF, signaling completing of non-duplicative date record accumulation and completion of a final output for identity verification; and
HAD-ENUF (Hasse Diagram Ensemble Unified Fusion), a counting method employing a supervised machine-learning approach for ensemble data fusion, automatically incrementing counts during the identity validation process and implementing a stopping rule that ends the circulation of EARLI among ensemble network participants, signifying that the final verification result has been successfully computed.

2. The counting machine of claim 1, wherein the totality of supporting information is continuously compared to a previous iteration and modified to incorporate changes.

3. The counting machine of claim 2, further comprising:
the distribution network implemented over-the-top of a public network;
a multiple-key encryption protocol used to ensure that only permitted network participants can originate, receive and modify data records; and
an industry-standard encryption protocol used to ensure that only permitted network participants can correctly decrypt the data records they have received, plus all submitted data records can be checked by any permitted network participant who receives them to ensure the data record originated from a permitted network participant, both uses of the encryption protocol using decryption keys generated randomly by a central network server.

4. The counting machine of claim 2, wherein the totality of supporting information is a digital record consisting of sequences of counts pertaining to items related to identity verification and the network is an electronic digital network, and further comprising:
a network participant routing sequence; and
a governor provided validation of an entity's digital identity in response to the network participant routing sequence.

5. The counting machine of claim 4, wherein the electronic digital network comprises a digital, private telecommunications electronic network.

6. The counting machine of claim 4, wherein said governor adds and enforces rules to facilitate convergence to a final information section in which the trust value and the confidence score are determined.

7. The counting machine of claim 1 whereby the first recipient can specify rules limiting distribution of the newly submitted digitally-signed data record.

8. The counting machine of claim 7 whereby the rules limiting distribution are different for each member.

9. The counting machine of claim 7 whereby all rules limiting distribution and the totality of supporting information are stored in a Managed Secure-Immutable-Nonreputable-Replicated-Verifiable and Fault-Tolerant Distributed Datastore.

10. The counting machine of claim 9 where said Managed Secure-Immutable-Nonreputable-Replicated-Verifiable and a Fault-Tolerant Distributed Datastore uses public encryption keys as part of a specified public-key-cryptography method, to encode a random symmetric key, generated specifically for each said totality of supporting information for a specified symmetric-key-cryptography method and mode, with a date-and-time of the supporting information EARLI submission is appended to a symmetric key, each version of which is concatenated end-to-end with a plaintext delimiter, whereby its timeliness is verified by processing the concatenated string, decrypting it with its private key, until it finds the sub-string that decodes into a correct format with the date-and-time appended, and thereby learning the symmetric key.

11. The counting machine of claim 9 where the Managed Secure-Immutable-Nonreputable-Replicated-Verifiable and Fault-Tolerant Distributed Datastore is implemented as any type of blockchain.

12. The counting machine of claim 1 wherein said trust values and said confidence scores are updated in real-time via a machine learning algorithm.

13. The counting machine of claim 12 wherein said data records further are selected from a group consisting of: submitted credentials; documents; query-response challenges checking answers; query-response challenges checking time-to-respond; request involving personal history; recent transactions; direct examination of transaction history data; web presence; behavioral observations using social media posts; biometrics; facial recognition; eyeball scans; fingerprints; voice prints; keyboard typing speed; keyboard typing patterns; and gait.

14. The counting machine in claim 13, wherein historical data for machine learning on digital identity verification accuracy is specifically assembled, at the time a network participant initially proposed to join the network, via requiring that prospective participant to process a challenge test file consisting of a multitude of real or simulated data records;
whereby a size of the machine learning data set is increased to make identity verification difficult by introducing deliberate uncertainty and problems at measuring an accuracy of trust scores by a network participant attempting to join, and thereby providing a basis for computing the confidence values for such trust scores from that prospective participant.

15. The counting machine of claim 1, further comprising manufacturing and assigning a unique ID to each entity for which an identity verification is attempted.

16. The counting machine of claim 15, wherein:
a record for each unique ID is created, maintained and updated by the governor, and deleted if no further requests are received for this entity after an identified time interval.

17. The counting machine of claim 15, wherein the unique ID is created without the involvement of a network member, and that once created, the entity can request a secure copy, physical or digital or both, be given to them, and, once they are in possession of their unique ID they can initiate a request for specific identity verification to be communicated to a network member.

18. The counting machine of claim 15, further comprising the set of data being subject to permissioning rules that use a downloaders ID.

19. The counting machine of claim 15, further comprising validating the identity of a member upon a request.

\* \* \* \* \*